United States Patent
Schnitzer et al.

(10) Patent No.: US 11,242,083 B2
(45) Date of Patent: Feb. 8, 2022

(54) STEERING COLUMN FOR A MOTOR VEHICLE

(71) Applicants: thyssenkrupp Presta AG, Eschen (LI); thyssenkrupp AG, Essen (DE)

(72) Inventors: Hieronymus Schnitzer, Gamprin (LI); Ciprian Paltinisanu, Eschen (LI); Matthias Ancelin, Reichenberg (CH)

(73) Assignees: THYSSENKRUPP PRESTA AG, Eschen (LI); THYSSENKRUPP AG, Essen (DE)

(*) Notice: Subject to any disclaimer, the term of this patent is extended or adjusted under 35 U.S.C. 154(b) by 24 days.

(21) Appl. No.: 16/631,506

(22) PCT Filed: Aug. 6, 2018

(86) PCT No.: PCT/EP2018/071273
§ 371 (c)(1),
(2) Date: Jan. 16, 2020

(87) PCT Pub. No.: WO2019/030175
PCT Pub. Date: Feb. 14, 2019

(65) Prior Publication Data
US 2020/0172148 A1 Jun. 4, 2020

(30) Foreign Application Priority Data

Aug. 9, 2017 (DE) ............ 10 2017 213 895.5

(51) Int. Cl.
*B62D 1/19* (2006.01)
*B62D 1/185* (2006.01)

(52) U.S. Cl.
CPC ............ *B62D 1/192* (2013.01); *B62D 1/185* (2013.01)

(58) Field of Classification Search
CPC ......... B62D 1/192; B62D 1/185; B62D 1/195
See application file for complete search history.

(56) References Cited

U.S. PATENT DOCUMENTS

| | | | |
|---|---|---|---|
| 7,188,867 B2 * | 3/2007 | Gatti | B62D 1/195 280/777 |
| 10,315,682 B2 * | 6/2019 | Agbor | B62D 1/185 |

(Continued)

FOREIGN PATENT DOCUMENTS

| | | |
|---|---|---|
| CN | 1784331 A | 6/2006 |
| CN | 102015414 A | 4/2011 |

(Continued)

OTHER PUBLICATIONS

English Translation of International Search Report issued in PCT/EP2018/071273, dated Nov. 6, 2018.

*Primary Examiner* — Drew J Brown
(74) *Attorney, Agent, or Firm* — thyssenkrupp North America, LLC

(57) ABSTRACT

A steering column for a motor vehicle, with a first casing in which a steering spindle is rotatably mounted about an axis. The first casing and a second casing are arranged to be telescoped one into the other. The second casing can be connected to a body of the motor vehicle. The casings are coupled to one another via an energy absorption device which has at least two deformation sections arranged one behind the other in the direction of the axis. At least one of the deformation sections can be coupled between the casings via a coupling device or decoupled therefrom, and the deformation section can be plastically deformed in the coupled state in the event of relative displacement of the first casing with respect to the second casing. At least two deformation sections are formed on a single-piece energy absorption element.

19 Claims, 3 Drawing Sheets

(56) References Cited

U.S. PATENT DOCUMENTS

| | | | |
|---|---|---|---|
| 10,464,592 B2 * | 11/2019 | Messing | B62D 1/181 |
| 10,532,762 B2 * | 1/2020 | Sulser | B62D 1/195 |
| 2007/0194563 A1 | 8/2007 | Menjak | |
| 2012/0024101 A1 | 2/2012 | Schnitzer et al. | |
| 2013/0233117 A1 | 9/2013 | Read et al. | |
| 2015/0033901 A1 | 2/2015 | Read et al. | |
| 2015/0375773 A1 | 12/2015 | Tinnin | |
| 2016/0121920 A1 * | 5/2016 | Klepp | B62D 1/195 74/492 |

FOREIGN PATENT DOCUMENTS

| | | |
|---|---|---|
| CN | 102325687 A | 1/2012 |
| CN | 204222957 U | 3/2015 |
| CN | 105209317 A | 12/2015 |
| DE | 60 2004 012 021 T | 3/2009 |
| DE | 10 2015 204 476 B | 5/2016 |
| DE | 10 2016 214 709 A | 2/2018 |
| GB | 2059006 A | 4/1981 |
| WO | 2009121386 A | 10/2009 |
| WO | 2014183819 A | 11/2014 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2018/071273, filed Aug. 6, 2018, which claims priority to German Patent Application No. DE 10 2017 213 895.5, filed Aug. 9, 2017, the entire contents of both of which are incorporated herein by reference.

FIELD

The present disclosure generally relates to a steering column for a motor vehicle.

BACKGROUND

The first casing is part of an adjustment unit which rotatably supports the steering spindle about an axis, also referred to as a longitudinal axis, a steering wheel being disposed on that end of the steering spindle which is at the rear with respect to the direction of travel and faces the driver. The second casing can be fastened directly or indirectly to the body of the motor vehicle by means of a supporting device. In one design of the telescopic arrangement, the first casing can dip into the second casing and is then also referred to as an inner casing or inner casing tube, wherein the second casing forms the outer casing or the outer casing unit.

In order to adapt the steering wheel position to the sitting position of the driver of a motor vehicle, the steering wheel can be positioned by means of a telescopic longitudinal adjustment of the casings in the direction of the steering column longitudinal axis in the longitudinal direction of the passenger compartment of the vehicle.

An adjustment apparatus is provided for the longitudinal adjustment. The adjustment apparatus can have a manual clamping apparatus, also referred to as a fastening apparatus, which acts on the casings. In the opened state of the clamping apparatus—also equivalent to a release position— manual telescopic displacement of the casings in order to adjust the steering wheel position is possible, while in the closed state—referred to as the locked position or fastened position—the casings are clamped to one another and in the normal driving mode, the steering wheel position are fixed relative to one another under the mechanical stresses in the axial direction which are to be expected. The locked position can be set, for example, by manual activation of a clamping lever. As an alternative to the manual clamping apparatus, a motor-operated adjustment apparatus can be implemented, for example by means of a spindle drive with a threaded spindle which engages in a spindle nut and which can be driven in rotation relative to the spindle nut by motor, wherein the threaded spindle is supported on the one casing, and the spindle nut is supported on the other casing in the axial direction. As a result of relative rotation of the threaded spindle and spindle nut, motor-operated positioning of the casings in the axial direction is possible, and in the stationary state relative locking is brought about by the self-locking effect of the spindle drive.

It is known as an effective measure for improving vehicle occupant safety in the event of a vehicle collision, a so-called crash situation, in which the driver impacts against the steering wheel at a high speed, to couple an energy absorption apparatus, also referred to as a crash system, between the casings in addition to the adjustment apparatus. If, in a crash situation, the steering wheel is subjected by a body impacting into the steering wheel to a large force which exceeds a predefined limiting value, the two casings are also pushed together relative to one another in the axial direction even in a locked position of the adjustment device, wherein at least one deformation section of the energy absorption device is plastically deformed. In this case, the kinetic energy which is applied to the casings in the longitudinal direction is absorbed, i.e. converted into deformation work, so that the body impacting on the steering wheel is braked in a controlled fashion and the risk of injury is reduced.

It is known in the prior art, for example from US 2015/0375773 A1, to make the braking effect of the energy absorption device controllable, in order to take into account in a crash situation whether the driver is wearing a seat belt or not, or to be able to perform adaptation to parameters such as the vehicle speed, driver's weight, distance from the steering wheel and the like. In particular, for this purpose at least two deformation sections are to be provided, which can be activated when necessary by virtue of the fact that they are coupled between the casings by a coupling device. As a result of this switchable configuration of the coupling device it is possible to couple or decouple at least one of the at least two deformation elements. In this way, a switchable energy absorption characteristic, i.e. a crash level, which is adapted individually to the respective requirements, can be implemented.

In particular in the case of steering columns of the generic type with an adjustment device and switchable crash system with two crash levels there is only a relatively small installation space available for the energy absorption device. In this respect, the crash system known from the abovementioned US 2015/0375773 A1 has the advantage that the two deformation sections are arranged one behind the other in the axial direction, so that a narrow design, which is elongated in the axial direction, can be implemented. However, as a result of the fact that the deformation sections are embodied as separate bending elements which are only connected to one another in the crash system by connecting means, the necessary space requirement cannot be reduced further. Furthermore, it is disadvantageous that the fabrication and the mounting of a plurality of individual components are costly.

Thus a need exists to reduce the space requirement and the fabrication and mounting expenditure of the energy absorption device in a steering column.

According to the invention, it is proposed for a steering column that at least two deformation sections are formed on a single-piece energy absorption element.

DETAILED DESCRIPTION

Figure 1:
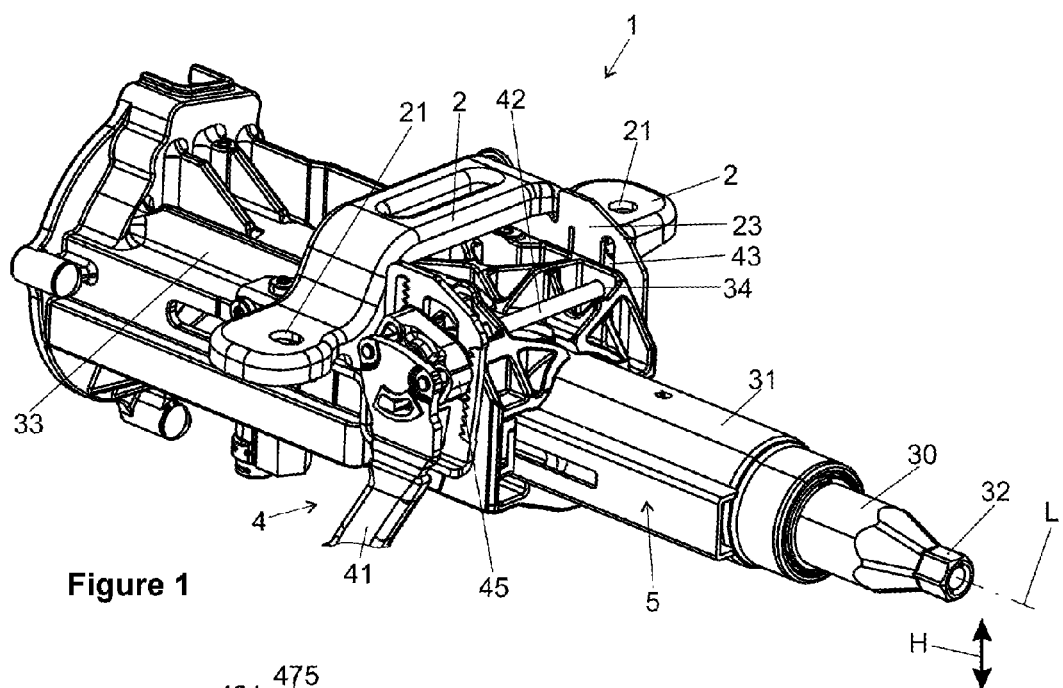
FIG. 1 is perspective view of a steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering column for a motor vehicle, comprising a first casing in which a steering spindle is rotatably mounted about an axis, wherein the first casing and a second casing are arranged in such a way that they can be telescoped one into the other in the direction of the axis, wherein the second casing can be connected to a body of the motor vehicle, wherein the casings are coupled to one another via an energy absorption device which has at least two deformation sections arranged one behind the other in the direction of the axis, and a coupling device, wherein at least one of the deformation sections can be coupled between the casings via the coupling device or decoupled therefrom, which deformation section can be plastically deformed in the coupled state in the event of relative displacement of the first casing with respect to the second casing.

In the energy absorption device according to the invention, the deformation sections are arranged one behind the other in the axial direction, so that an advantageously narrow arrangement which extends along the axis is implemented, similarly to that known from the closest known prior art according to the abovementioned US 2015/0375773 A1. Moreover, according to the invention both deformation sections of an energy absorption device which can be switched in two stages can be made available on a single energy absorption element. Instead of two individual energy absorption elements with one deformation section each, which deformation sections have to be manufactured individually and mounted to one another in a connected state in the prior art, in the invention just a single energy absorption element is necessary, as a result of which the fabrication and mounting expenditure is reduced significantly. For example, the manufacturing expenditure of an energy absorption element which is preferably fabricated from steel and is embodied as a bending strip with, according to the invention, two bending sections as punched and pressed parts, is comparable with one of the two bending elements which are necessary in the prior art, so that the fabrication is correspondingly more efficient. In addition, the handling and mounting of just one component in the steering column are simpler.

A further advantage of the single-piece energy absorption element according to the invention is that it can be embodied with the same energy absorption properties and with a lower material requirement and can therefore be made lighter in weight than two separate individual energy absorption elements which are subsequently connected to one another. The saving in weight and material which can thereby be achieved is advantageous with respect to lightweight design and saving energy.

The deformation sections can be connected to one another in one piece via a connecting section which is elongated in the axial direction and which has fastening means. The fastening means are configured to connect the energy absorption element to one of the casings, for example to the first casing, which can constitute, for example, an inner casing. The fastening means can comprise a positively locking element, such as, for example a projection which protrudes transversally with respect to the axial direction, or an integrally molded recess which can be moved into engagement with a corresponding opposing positively locking element on the casing in order to produce a positively locking fit which is active in the axial direction, which casing can correspondingly have a recess or a projection. Such a positively locking element can also be embodied in one piece with the energy absorption element, which is beneficial in respect of low fabrication expenditure.

The axial direction corresponds to the direction of the axis or the direction of the longitudinal axis, wherein the terms can be used completely synonymously with one another.

Alternatively or additionally, the fastening can be carried out by means of a fastening element such as a rivet, a bolt or the like. An alternative or additional means of securement using a materially joined connection, such as a weld or the like, is also conceivable.

A deformation section can preferably have in each case a coupling section for connection to a casing. Assuming that the energy absorption element is connected to the first casing, for example an inner casing, via fastening means, for example as described above in the connecting section, the securement of the deformation section to the second casing, for example an outer casing or an outer casing unit, is carried out in each case via the coupling section, so that in a crash situation the energy can be applied to the deformation section via the coupling section. A coupling section can have a positively locking element such as an opening or a projection and can also be connected directly to the second casing or indirectly to the second casing via additional intermediate elements or transmitting elements. In particular, a coupling device can be provided with an engagement part which is or can be coupled to one coupling section or both coupling sections and can be supported on a casing in the axial direction. The coupling device is configured so as to be switchable for at least one coupling section, in order to couple or decouple at least one deformation section between the casings by means of the coupling device. The other coupling section can always be coupled between the casings via a fixed engagement part to the associated deformation section, or also can be embodied in a switchable way so that optionally one or other of the two deformation sections can be coupled.

One preferred embodiment provides that the energy absorption element is embodied as a bending strip which is elongated in the direction of the axis and has a connecting section, at whose end regions, opposite in the direction of the axis, two U-shaped bending sections are formed, at each of which sections a free limb is connected to the connecting section via a bent-over portion. As a result, a single-piece double bending strip is formed in which the connecting section forms a common first limb of the two connecting sections which are arranged at the outer ends, lying opposite in the axial direction, of the connecting section. The common limb, implemented by means of the connecting section, of the two bending sections advantageously permits a saving in terms of material and weight in comparison with the bending strips which are separate in the prior art. At the two ends, pointing outward in opposite axial directions, of the connecting section, the bending strip is bent over in each case through approximately 180°, so that the free limbs which adjoin the bent-over sections point toward one another in the axial direction. The bent-over sections preferably lie parallel to a plane on the same side of the connecting section, so that the free limbs are aligned with one another in the axial direction. As a result, a flat compact shape of the energy absorption element is made possible.

A coupling section can be formed in each case in the region of the free end of a free limb. Such a coupling section is preferably formed in one piece with the bending strip. For example, in order to apply a tensile force to the limb, a coupling section can be embodied in a hook shape or can have a coupling opening transversely with respect to the axial direction, and in order to apply a compressive force it can have a supporting face directed toward the axial direction or a similar force-transmitting element which can be compressively loaded.

There can preferably be provision that the switchable coupling device has at least one-preferably pyroelectric-actuator with a movable coupling element which can be operably engaged in order to couple or decouple a deformation section between the casings i.e. between the first casing and the second casing. The coupling element can be, for example, a coupling pin or coupling bolt which in the coupled state a connection between a coupling section of a deformation element, for example a bending section, and a casing, or an intermediate or transmitting element, for example an engagement part, which engages with the casing non-displaceably in the axial direction. When the coupling device is activated, the coupling element can be removed from the operable connection to the coupling section, as a result of which the deformation element is decoupled from the force flux between the casings, and the respective deformation element is switched off, i.e. deactivated, in a crash situation. As a result, a relatively low crash level with relatively low energy absorption can be switched on. Alternatively, it is conceivable that when the coupling device is activated the coupling element is engaged with the coupling section, in order to switch on the deformation element in order to activate a relatively high crash level. The use of a pyro-electrical actuator, referred to for short as a pyro switch, has the advantage of rapid activation with a sufficiently high activation force.

One advantageous embodiment provides that the coupling device interacts with an engagement part which has a first driver element which can be operably engaged with the first deformation element, wherein the engagement part has at least one connecting part which has a second driver element which can be operably engaged with the second deformation element, wherein the engagement part and the connecting part are connected via the coupling device in such a way that they can be separated from one another. The engagement part serves as an intermediate element or transmitting element between one of the casings, for example the outer casing, on which it can be supported in the axial direction in a crash situation, in order to transmit force into the energy absorption element, on which it can engage into the coupling sections via the driver elements.

The engagement part is embodied separately from the energy absorption element. In a crash situation it ensures that energy is transmitted from the casing unit to the energy absorption device, on the one hand via the connection to the casing and on the other hand via the connection to one deformation section or both deformation sections. Said deformation part is defined by the fact that it is configured so as to be separable transversally with respect to the axial direction or longitudinal direction, so that it can be separated into at least two partial elements which can be moved decoupled in the longitudinal direction and independently of one another. This is implemented by the fact that the at least one connecting part can be detached from the engagement part, i.e. can be decoupled in the axial direction, by decoupling the coupling device.

In the locked position the engagement part is connected non-displaceably with respect to the longitudinal direction, i.e. in the axial direction, to the one casing, for example by corresponding positively locking elements which engage one in the other, such as a toothing arrangement or the like of a locking element, as will be explained in more detail below. The connecting part forms a partial element which is optionally connected to the engagement part by the coupling device, as a result of which the connected or coupled state is implemented, or in the disconnected or decoupled state it is detached from the engagement part by the coupling device which is then decoupled. In the coupled state, the at least one connecting part is moved in a crash situation together with said engagement part in the longitudinal direction relative to the inner casing, which is also referred to as the inner casing tube. In the separated, decoupled state, the connecting part does not have any mechanical connection to the engagement part via the coupling device so that in a crash situation only the engagement part is moved relative to the inner casing tube, but the connecting part is stationary relative to the inner casing tube.

As a result of the fact that the engagement part is operably connected to the coupling section of the first deformation element via a first driver element, and the connecting part has a second driver element which is operably connected to the coupling section of the second deformation element, in the connected state in which the connecting part is connected to the engagement part by the coupling device and in a crash situation it is moved together with said engagement part relative to the inner casing tube, in a crash situation the first and the second deformation element are deformed together. As a result, a high crash level with high energy absorption is implemented. In the separated state, in a crash situation only the engagement part is moved relative to the inner casing tube, so that only the first deformation element which is connected to the engagement part is deformed and a relatively low crash level with low energy absorption is implemented. In the separated state, the second deformation element which is connected to the detached connecting part, which is separated from the engagement part, is not deformed, it is deactivated and does not absorb any energy.

In the invention, the activation of the coupling device permits controlled separation of the engagement part where necessary, wherein at least one connecting part is detached from the engagement part and as a result the crash level can be changed as described above.

The inventive switching of the energy absorption device has the advantage that the coupling device does not interact directly with one of the deformation elements as in the prior art but rather the engagement part can remain connected via the first driver element and the connecting part can remain connected via the second driver element to the respective deformation elements independently of the state of the coupling device.

The separation of the connecting part from the engagement element does not engage in the connection of the driver elements to the deformation elements. As a result, the function of the connection between the deformation elements and the engagement part is independent of the function of the coupling or decoupling of individual deformation elements. As a result of the fact that the functionality of the mechanical separation from the force flux in a crash situation is implemented independently of the connection of the deformation elements to the engagement part, the deformation elements can be optimized with a greater freedom of design with respect to the energy absorption behavior.

The detachable connection between the engagement part and the connecting part can advantageously be configured independently of the connection between the engagement part and the deformation element and adapted to the required functionality. The stresses which are to be expected between the engagement part and the connecting part can be absorbed by structural measures, in order to ensure that reliable separation occurs when the coupling device is activated in a crash situation. In this context, optimization can be achieved with respect to the coupling and decoupling of the engagement part and connecting part, without having to accept compromises which can result, for example, from the deformation behavior of the deformation elements.

As a result of the fact that the connection of the deformation elements to the engagement part and the connecting part is independent of the functionality of the switching over of the energy absorption device, which switching over is exported according to the invention into the separation of the engagement element, there is a relatively large degree of freedom of configuration with respect to the embodiment and spatial arrangement of the deformation elements. As a result, better adaptation can occur to the available installation space, for example by implementing relatively small dimensions or predefined shaping.

The engagement part and/or the connecting part can have positively locking elements with which the coupling element interacts. In the connected state, the coupling element can engage in a positively locking fashion into the positively locking elements and as a result couple or lock the connecting part and the engagement part to one another in a positively locking fashion, so that in a crash situation the force is transmitted in the longitudinal direction via the positively locking fit, and the connecting part is moved together with the engagement part relative to the inner casing tube. As a result of the activation of the actuator, the coupling element can be moved out of the positively locking element so that the positively locking connection is released and as a result the connecting part is separated from the engagement part.

The decoupling can be promoted by the fact that the coupling element and/or at least one of the positively locking elements is configured in a friction-reducing fashion. In this context, at least one of the surfaces of a coupling element or positively locking element which bear against one another and slide on one another when the actuator is activated can be provided, for example, entirely or partially with a friction-reducing coating, or with sliding elements which reduce the friction through material or shaping.

In one embodiment of the invention, the positively locking elements can have at least one positively locking opening which runs transversally with respect to the longitudinal direction and in which the coupling element can be received. The positively locking opening can extend, for example, in the circumferential direction tangentially at a radial distance from the longitudinal axis, through the engagement part and the connecting part. An essentially pin-shaped coupling element for producing a positively locking connection can be received in said opening. In order to separate the connection, the coupling element can easily be pulled out from the positively locking opening by activating the actuator. The pin-shaped coupling element which is inserted into the positively locking opening brings about effective, positive locking of the connecting part to the engagement part with means which are of simple design. The removal of the coupling element in order to separate the connecting part can be brought about safely and with little expenditure. This results in a functionally safe design which is flexible and can be implemented in a relatively small installation space.

In one advantageous development there may be provision that the engagement part and/or the connecting part are/is embodied as an impact-extrusion part or as a sintered part. This permits simple and cost-effective manufacture.

It is also advantageous that the actuator is embodied as a pyroelectrical actuator. The pyroelectrical actuator can be actuated in order to drive the coupling element pyrotechnically. A pyroelectrical actuator is often referred to as "pyroswitch", and has a pyrotechnic propellant which is fired by an electrical control pulse. The explosion of the propellant accelerates a movable actuator which is connected to a coupling element in the present application. As a result, the coupling element can be moved in order to perform the inventive separation of the connecting part from the engagement part, or can bring about mechanical coupling or decoupling of the engagement part and the connecting part in some other way. Advantages of such a pyroelectrical coupling device are the extremely rapid triggering in a crash situation and the high level of reliability and the large activation force which ensure safe coupling or decoupling of one or more connecting parts when necessary. For example, the coupling element can be embodied in a pin shape and is pyrotechnically shot out from the positively locking elements, for the decoupling of the connecting part from the engagement part.

The engagement part can be connected to the one casing tube via a predetermined break element. The predetermined break element can be embodied, for example, as a breakaway rivet, a shear bolt or the like, which breaks when a defined limiting force, the so-called breakaway force, is exceeded, said force occurring only in a crash situation in the longitudinal direction between the outer casing unit and the casing tube, and as a result releases the relative movement of the engagement part relative to the energy absorption element which is supported on the casing tube. This ensures that force is applied into the energy absorption elements only when the limiting force is exceeded, that is to say actually only in a crash situation. This ensures the functional safety of the energy absorption device.

In a manually adjustable steering column, a clamping device is provided for implementing the embodiments of the invention as described above, which clamping device when in the locked position secures the casings relative to one another and when in the release position releases telescopic adjustment of the casings, wherein the clamping device has at least one locking part which is supported in the axial direction on the one, for example the outer, casing, and in the locked position it is connected to the engagement part in a non-displaceable fashion in the axial direction, which engagement part is connected to the other, for example the inner, casing, and in the release position is detached from the engagement part and releases a relative movement of the casings. The locking part is moved during manual activation of the clamping device so that release position it is detached from the engagement part and is connected to the engagement part in the locked position, and therefore the engagement part is operably connected to the outer casing, and in a crash situation applies the force to the energy absorption element.

In a steering column which can be adjusted by motor, there can be provision that arranged between the casings there is a motor adjustment drive which is embodied as a spindle drive, with a threaded spindle which engages in a spindle nut and can be driven in rotation relative to the spindle nut, wherein the threaded spindle is supported on the one casing, and the spindle nut is supported on the other casing, in the axial direction, and wherein the energy absorption element is arranged between the spindle nut and a casing or between the threaded spindle and a casing, wherein the spindle nut or the threaded spindle is supported on the engagement part in the axial direction. In this embodiment, the engagement part is always supported in the axial direction on the casing, preferably on the outer casing, via the spindle drive. In a crash situation, the force is transmitted from the casing on which the adjustment drive is supported via the threaded spindle and the spindle nut to the engagement part and from there to the energy absorption element which is supported on the other casing.

Both in the case of a steering column which can be adjusted manually and in the case of a steering column which can be adjusted by motor a single-piece energy absorption element according to the invention with two deformation sections in combination with a separable engagement part is advantageous with respect to a simple, functionally reliable and compact design.

At least one deformation element can be connected to a casing via a predetermined break element. The predetermined break element fractures or tears when a defined set point breaking force is exceeded in the axial direction, which force is brought about only in a crash situation, so that the relative movement of the free limb of the bending element for deformation in the axial direction is released. For example, a shearing pin can be provided which is led through a coupling section transversally with respect to the axis and which shears off in a crash situation and as a result releases the relative movement of the coupling section for deforming the bending section.

A casing, preferably the outer casing which receives the inner casing, can be embodied so as to be adjustable relative to the supporting unit in the vertical direction transversally with respect to the axis. As a result, manual or motor-operated vertical adjustment of the steering column can be implemented.

Figure 8:
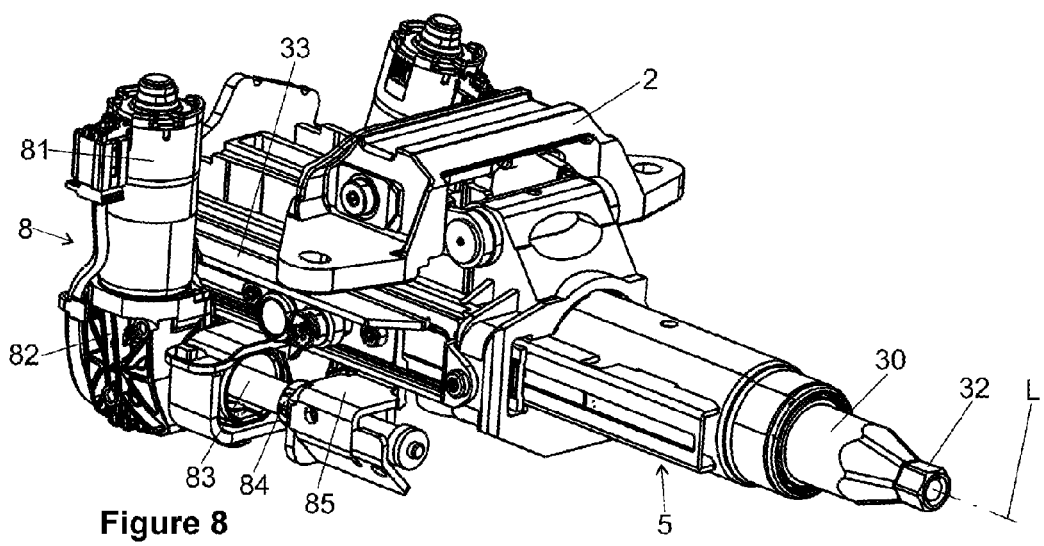
FIG. 8 is a perspective view of a steering column which can be adjusted by motor.

FIGS. 1 and 8 each illustrate a steering column 1 according to the invention in a schematic, perspective view seen obliquely from the rear with respect to the direction of travel of a motor vehicle (not shown). FIG. 1 shows a manually adjustable embodiment and FIG. 8 shows an embodiment which can be adjusted by a motor wherein the same reference symbols are used for components which have the same effect.

The steering column 1 can be fastened to the body of a motor vehicle (not illustrated) by means of a bracket 2. The bracket 2 comprises, for connection to the vehicle body, fastening means 21, from which side elements 22, 23 extend.

A steering spindle 30 is mounted so as to be rotational about the axis L—the longitudinal axis—in a first casing, embodied in an inner casing tube 31, referred to for short as casing tube 31, wherein at the rear end 32 a steering wheel (not illustrated) can be fastened on the steering spindle 30. The inner casing tube 31 is mounted in a receptacle, which passes through in the longitudinal direction, i.e. in the direction of the longitudinal axis or in the direction of the axis L, of a second casing in the form of an outer casing unit 33, referred to for short as casing unit 33.

A clamping device 4 can be moved optionally into locked position (secured position, closed state) or release position (detached position, opened state) by manual activation of a clamping lever 41. In this context, in the release position the inner casing tube 31 can be displaced in a telescopic fashion for longitudinal adjustment in the axial direction of the axis L within the outer casing unit 33, and the outer casing unit 33 can be adjusted up and down in the vertical direction H relative to the bracket 2 in the directions of the arrow. In the locked position, the inner casing tube 31 is locked in the longitudinal direction and the outer casing unit 33 is locked in the vertical direction H. The locked position corresponds to the normal operation of the steering column 1 in which it is ensured that the steering wheel position which has been set is not changed in the case of the forces which usually act on the steering spindle 30 via the steering wheel.

In particular, the clamping device 4 comprises a clamping bolt 42 which is connected in a rotationally fixed fashion to the clamping lever 41 and which is guided, transversally with respect to the axis L, through elongate holes 43 in the side elements 22, 23 which lie opposite one another. In the event of a rotation, the support disk 45 is displaced axially relative to the clamping bolt 42, and therefore pressed outward against the side element 22 by a clamping mechanism which is known per se and which can comprise, as in the illustrated embodiment, a tilting pin arrangement 44 which is supported in a rotationally fixed fashion on the clamping bolt 42, and a support disk 45 which is arranged opposite said tilting pin arrangement 44 and is arranged in a rotationally fixed fashion on the side element 22. As a result of the fact that the clamping bolt 42 is mounted in an axially non-displaceable fashion on the opposite side element 23, the two side elements 22 and 23 are moved toward one another and the outer casing unit 33 which is arranged between them is clamped tight in a frictionally locking fashion. Instead of the tilting pin arrangement 44, 45, which is shown, other mechanisms can also be used to convert a rotation of the clamping bolt 42 into a clamping movement, for example with clamping disks or roller bodies. Alternatively it is conceivable and possible that the clamping device is embodied in an electromechanical fashion, in which the transfer from the release position into the locked position, and vice versa, is carried out by means of an electric motor.

The clamping bolt 42 is guided through openings 34, lying opposite one another transversally with respect to the axis L in the casing unit 33, which is embodied in a slotted fashion, similarly to a clamping sleeve, between the openings 34 in the longitudinal direction. As a result, when the described clamping of the side elements 22, 23 of the bracket 2 occurs as a result of the clamping force, the outer casing unit 33 is compressed transversally with respect to the axis L, so that the locked position is set, wherein the inner casing tube 31 is clamped tight in a frictionally locking fashion in the casing unit 33.

The clamping device 4 has a locking part 46 and an engagement part 47. The locking part 46 is mounted in a non-displaceable fashion on the casing unit 33 in the longitudinal direction, i.e. in the axial direction of the axis L. In the vertical direction H, the locking part 46 is mounted in such a way that it can move up and down in order to set the locked position and release position. The engagement part 47 is connected to the casing tube 31 via an energy absorption device 5, which will be explained in more detail below. On its sides directed toward one another transversally with respect to the axis L, the locking part 46 and the engagement part 47 have corresponding toothing arrangements 461 and 471 which can be engaged with one another in a positively locking fashion and have teeth which run transversally with respect to the longitudinal axis L.

In the locked position of the clamping device 4, the locking part 46 is pressed against the engagement part 47 by a spring 421 which is supported on the casing unit 33, as a result of which the toothing arrangements 461 and 471 are held in a positively locking fashion. The locking part 46 and the engagement part 47 are connected to one another in a non-displaceable positively locking fashion in the longitudinal direction in the locked position by the teeth which engage in one another and run transversally with respect to the longitudinal axis L. This can be clearly seen in FIG. 5.

An eccentric cam 422, which interacts with a cam track 462 of the locking part 46, is mounted on the clamping bolt 42. If the clamping bolt 42 is moved into the release position by rotating the clamping lever 41 in the clockwork direction, the cam 422 is moved against the cam track 462 and lifts the locking part 46 up counter to the spring force of the spring 421—in the upward direction in the figures—so that the toothing arrangements 461 and 471 are lifted off from one another and therefore disengaged. In this release position, the clamping of the casing tube 31 in the casing unit 33 is released, so that the clamping tube 31 can be moved slightly forward or backward in the casing unit 33 for the longitudinal adjustment in the axial direction of the longitudinal axis L.

Figure 3:
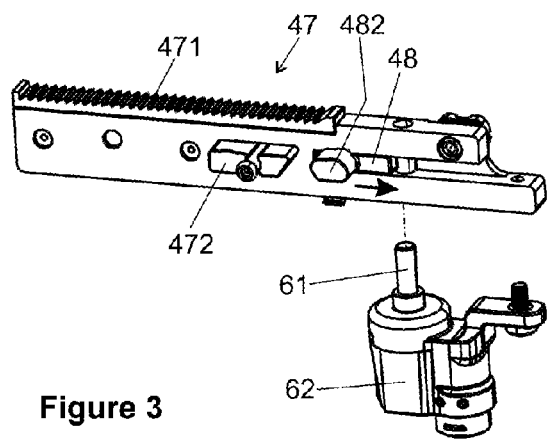
FIG. 3 is a detailed view of the energy absorption device according to FIG. 2 in a partially exploded state.

The engagement part 47, which is shown separately in FIG. 3 in a view from the casing tube 31, has a connecting part 48. The engagement part 47 has a first driver 472 which protrudes toward the casing tube 31, transversally with respect to the axis L, and which forms a first driver element, and the connecting part 48 a second driver 482, which forms a similarly shaped second driver element, is arranged at a distance in the axial direction from the first driver 472.

The engagement part 47 and the connecting part 48 are connected to one another via a coupling device 6 which has a pin-shaped coupling element 61 which is connected to a pyroelectrical actuator 62. In the coupled state, the coupling element 61 ensures, via a positively locking connection, that there is mechanical coupling of the engagement part 47 and connecting part 48 in the axial direction. As a result of the triggering of the actuator 62, the coupling element 61 is moved out of the positively locking fit, so that the mechanical connection is separated. As a result, the connecting part 48 can be moved relative to the engagement part 47 in the axial direction, and correspondingly the first driver 472 can also be moved relative to the second driver 482 as indicated in FIG. 3 by the arrow.

In other words, in the coupled state both drivers 472 and 482 are connected in a positionally fixed fashion to the engagement part, and in the decoupled state only the first driver 472 is still connected to the engagement part, while the second driver 482 is not connected in the axial direction.

Figure 4:
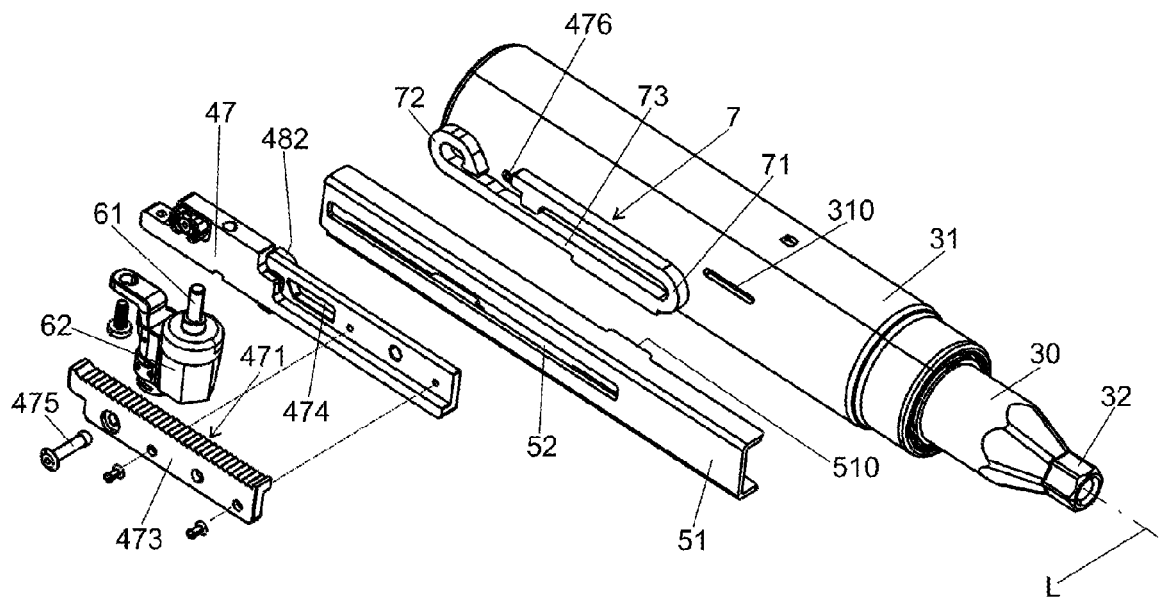
FIG. 4 is a partially exploded view of the casing tube with the energy absorption device according to FIG. 2.

Between the engagement part 47 and the casing tube 31 there is the energy absorption device 5 which is shown in an exploded illustration in FIG. 4. The energy absorption device 5 is attached to the inner casing tube 31, on the side facing the viewer, and has a profiled securing element 51 in the form of a C-shaped rail with an essentially rectangular cross section, which rail is fixedly connected to the inner casing tube 31 and extends in the longitudinal direction, wherein the open cross section is directed toward the outer side of the inner casing tube 31. The profiled securing element 51 is fixedly connected to the casing tube 31, for example by means of laser welding, by means of positively locking elements 510 which engage in corresponding receptacle openings 310 in the inner casing tube 31. In this way, as profiled securing element 51 forms, together with the inner casing tube 31, an elongated housing of the energy absorption device 5 with an essentially rectangular cross section which extends on one side of the casing tube 31 parallel to the axis L. On its outer side directed radially outward, the profiled securing element 51 which is embodied as a profiled securing element 51 has a slot 52 which extends parallel to the axis L.

The engagement part 47 is mounted on the outside of the profiled securing element 51, so that the drivers 472 and 482 project into the interior of the profile securing element 51 through the slot 52.

The first driver 472 is formed on a toothed plate 473 which has the toothing arrangement 471 and projects therefrom in a positively locking fashion through an opening 474 and protrudes in said fashion from the engagement part 47. By means of a predetermined break element in the form of a shearing bolt 475, the toothed plate 473 is fastened to the engagement part 47, and the engagement part 47 is fastened to the casing tube 31. The shearing bolt 475 is guided through the first driver 471 and inserted into a fastening opening 476 in the casing tube 31, as is apparent from FIGS. 4 and 5.

Figure 2:
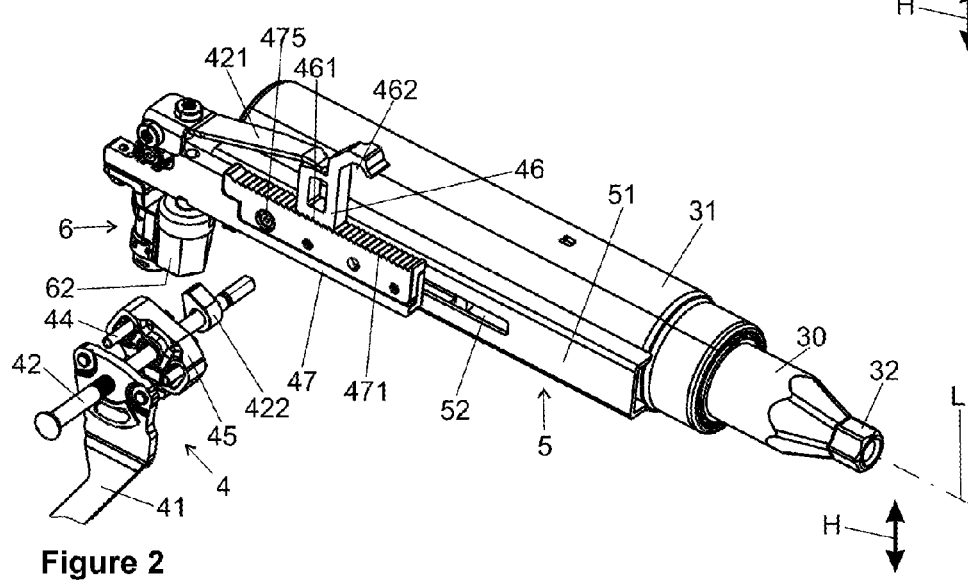
FIG. 2 is a detailed view of the inner casing tube of the steering column according to FIG. 1 with a clamping device and energy absorption device.
Figure 5:
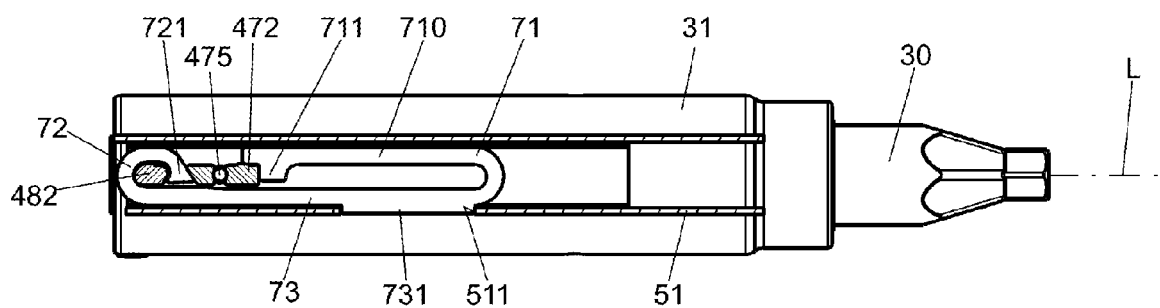
FIG. 5 is a longitudinal sectional view through the energy absorption device of the steering column according to FIGS. 1 to 4 in an operationally ready normal state before a crash.

An energy absorption element according to the invention, which is embodied as a bending strip 7, is arranged in the profiled securing element 51. FIG. 5 shows the installation situation as in FIG. 2 in the longitudinal section through the profiled securing element 51.

The bending strip 7 is embodied as a single-piece punched part, preferably made of steel, and has a first bending section 71 as a first deformation section, and according to the invention a second bending section 72 as a second deformation section, which sections are each embodied in a U shape and at the same time are connected to one another in one piece via a connecting section 73 in such a way that said connecting section 73 forms a common U limb. The free limbs 710 and 720 of the bending sections 71 and 72 are located on the same side of the connecting section 73, wherein they are directed toward one another with their free ends and extend essentially flush with one another in the axial direction. A first coupling section 711 in the form of a thrust element is molded on in one piece at the free end of the first free limb 710. At the free end of the second free limb 720, a second coupling section 721 is also formed in one piece in the form of a pulling hook.

The connecting section 73 has a third coupling section 731 which is embodied as a projection on the side facing away from the bending sections 71 and 72. The coupling section 73 engages in a positively locking fashion into a corresponding fastening opening 511 in the profiled securing element 51. As a result, the bending strip 7 on the connecting section 73 is locked in a positively locking fashion on the casing tube 31 in the axial direction.

FIG. 5 shows the situation in the normal operating state, that is to say before a crash. It is apparent how the first driver 472 engages in the axial direction on the front of the coupling section 711 of the first bending section 71, and the second driver 482 engages behind the hook-shaped second coupling section 721 of the second bending section 72.

Figure 6:
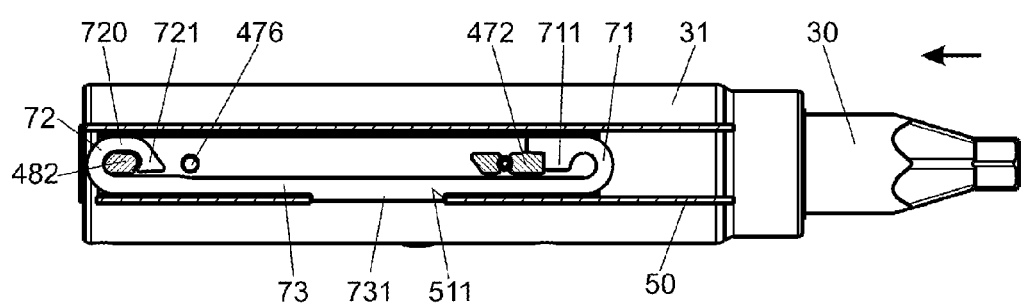
FIG. 6 is a longitudinal sectional view of the energy absorption device according to FIG. 5 after a crash with a low crash level.
Figure 7:
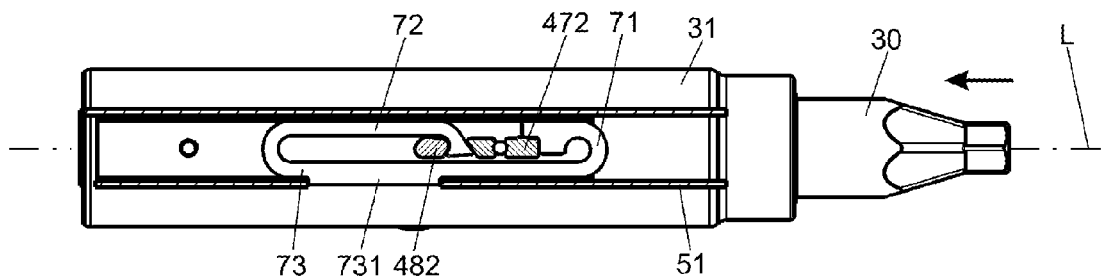
FIG. 7 is a longitudinal sectional view of the energy absorption device according to FIG. 5 after a crash with a high crash level.

In a crash situation, such a large impetus is exerted by an impacting body that the securing effect of the frictionally locking clamping is overcome and casing tube 31 is pushed into the casing unit 33 in a telescopic fashion in the axial direction, in the direction of travel, as is indicated by the arrow in FIGS. 6 and 7. In this context, the engagement part 47 is supported via the locking part 46 on the outer casing unit 33 in the axial direction, so that a relative movement correspondingly occurs in the axial direction with respect to the inner casing tube 31. As a result of the relative movement, the shearing bolt 475 is sheared off and releases the movement of the engagement part 47 relative to the casing tube 31, so that the bending strip 7 can be deformed in order to absorb energy, wherein the scope of the energy-absorbing deformation is determined by the switched state of the coupling device 6.

When there is a high vehicle speed and/or large driver weight, a high crash level with a high energy absorption capability is aimed at. This is brought about by virtue of the fact that the engagement part 47 and the connecting part 48 remain connected to one another, and correspondingly the first driver 472 and the second driver 482 are together moved relative to the casing tube 31. In the present embodiment this is achieved in that the pyroelectric-actuator 62 is not activated and remains inactive, and the coupling element 61 connects the engagement part 47 and the connecting part 48. This situation after a crash with a high crash level is illustrated in FIG. 7: in contrast with the state of rest in FIG. 5, the first bending section 71 has been deformed by the first driver 471 by pressure on the free limb 710, and the second bending section 72 has been deformed by the second driver 482 by tension on the free limb 720. Both bending sections 71 and 72 are deformed.

In the event of a relatively low crash level being required, for example in the case of a low speed and/or low driver weight, the pyroelectric-actuator 62 is fired so that the coupling element 62 is pulled out and the connecting part 48 is operably separated from the engagement part 47. Then, as shown in FIG. 6, only the first driver 471 is moved relative to the bending strip 7, so that only this first bending section 71 is deformed in order to absorb energy. The detached second driver 482 is moved along in a slack fashion and cannot exert any force on the second bending section 72, so that the latter remains undeformed and does not absorb any energy.

The bending strip 7 which is in one piece according to the invention and has the two bending sections 71 and 72 which are integrated in one piece permits a particularly lightweight and compact design and is easy and cost-effective to manufacture and mount.

Figure 9:
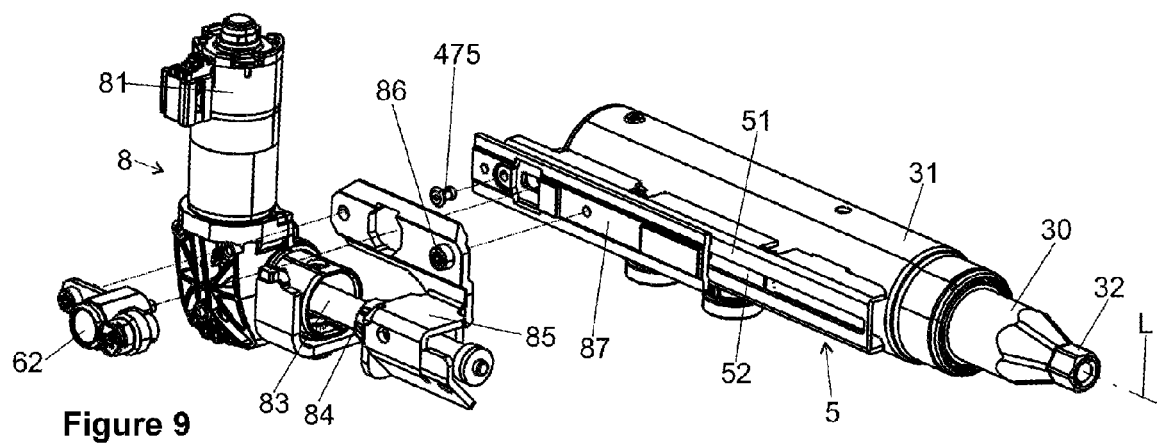
FIG. 9 is a detailed view of the inner casing tube of the steering column according to FIG. 8 with a motor-operated adjustment device and energy absorption device.

FIGS. 8 and 9 illustrate a further design of a steering column which has a motor-operated adjustment drive 8.

The adjustment drive 8 comprises an electric servomotor 81 which is secured to the casing unit 33 and drives a threaded spindle 83 via a transmission 82, which threaded spindle 83 extends essentially parallel to the axis L and engages in a spindle nut 84 in order to form a spindle drive. The spindle nut 84 is mounted in a rotationally fixed fashion on a transmitting element 85 which is connected to an engagement part 87 by means of a connecting element 86. The engagement part 87 is connected to the profiled securing element 51 by means of a predetermined break element which is embodied as a rivet so that when a predetermined break away force is exceeded in a crash situation the predetermined break element 475 fractures and the connection between the engagement part 87 and the profiled securing element 51 is canceled.

With respect to the functional interaction with the energy absorption element 5, the engagement part 87 is configured to have the same effect as the engagement part 47 described above. The energy absorption device 5 is also configured to have the same functional effect and comprises, in particular, drivers 472 and 482 which can be optionally switched on and which can interact with the inventive bending strip 7, as illustrated in FIGS. 5 to 7. The individual functional parts such as coupling device 6 can be implemented essentially identically and are omitted from the drawing only for the sake of clarity.

In a crash situation, the force flux in the electrically adjustable steering column 1 according to FIG. 8 runs from the casing tube 31 to the casing unit 33 via the bending strip 7, the engagement part 87 and the adjustment drive 8. In the manually adjustable steering column 1 according to FIGS. 1 to 4, the force is transmitted from the engagement part 47 to the casing unit 33 via the locking part 46. The function of the energy absorption device 5 which is configured according to the invention is analogous.

LIST OF REFERENCE SYMBOLS

1 Steering column
2 Bracket
21 Fastening means
22, 23 Side element
30 Steering spindle
31 (inner) casing tube
310 Receptacle openings
32 End
33 (outer) casing unit
4 Clamping device
41 Clamping lever
42 Clamping bolt
421 Spring
422 Cam
43 Elongate hole
44 Tilting pin arrangement
45 Support disk
46 Locking part
461, 471 Toothing arrangement
462 Cam track
47 Engagement part
472 First driver
473 Toothed plate
475 Shearing bolt
476 Fastening opening
48 Connecting part
482 Second driver
5 Energy absorption device
51 Profiled securing element
510 Positively locking elements
511 Fastening opening
52 Slot
6 Coupling device
61 Coupling element
62 Pyroelectrical actuator
7 Bending strip 71, 72 Bending sections
710, 720 Free limbs
711, 721 Coupling section
73 Connecting section
731 Coupling section
8 Adjustment drive
81 Servomotor
82 Transmission
83 Threaded spindle
84 Spindle nut
85 Transmitting element
86 Connecting element
87 Engagement part
L Axis (longitudinal axis)
H Vertical direction

What is claimed is:

1. A steering column for a motor vehicle, comprising:
a steering spindle defining an axis of rotation;
a first casing;
a second casing telescopically receiving the first casing, the second casing configured to connect to a body of the motor vehicle;
an energy absorption device coupling the first and second casing to each other, the energy absorption device comprising two deformation sections arranged one behind the other in the direction of the axis; and
a coupling device, wherein at least one of the two deformation sections is configured to couple between the casings via the coupling device or decouple therefrom, at least one of the two deformation sections configured to plastically deform in the coupled state in the event of relative displacement of the first casing with respect to the second casing, wherein the at least two deformation sections are formed on a single-piece energy absorption element, wherein the coupling device has at least one actuator with a movable coupling element which is configured to be operably engaged to couple to or decouple from one of the at least two deformation sections at a position between the first and second casings,
wherein the coupling device interacts with an engagement part which has a first driver element which is configured to operably engage with a first of the two deformation sections, wherein the engagement part has at least one connecting part which has a second driver element which is configured to operably engage with a second of the two deformation sections, wherein the engagement part and the connecting part are connected via the coupling device so as to be separated from one another.

2. The steering column of claim 1 wherein the deformation sections are connected to one another in one piece via a connecting section which extends along the direction of the axis, wherein the connecting section has a fastening means.

3. The steering column of claim 1 wherein each of the two deformation sections has one coupling section for connecting to the first casing.

4. The steering column of claim 1 wherein the energy absorption element is a bending strip that extends in the direction of the axis and has a connecting section with two end regions located opposite in the direction of the axis, the two end regions each comprising a U-shaped bending sections, each of said bending sections including a free limb connected to the connecting section via a bent-over portion.

5. The steering column of claim 4 wherein a coupling section is formed in the region of a free end of each free limb.

6. The steering column of claim 1 wherein a clamping apparatus is provided which in a locked position secures the casings relative to one another and which in a released position permits telescopic adjustment of the casings, wherein the clamping apparatus has at least one locking part which is supported on one of the first and second casings in the direction of the axis, and in the locked position is connected to the engagement part so as to be non-displaceable in the direction of the axis, said locking part connected to the other of the first and second casings, and in the release position is disconnected from the engagement part and permits a relative movement of the casings.

7. The steering column of claim 1 wherein a motor-operated adjustment drive is arranged between the first casing and the second casing and includes a spindle drive with a threaded spindle that engages in a spindle nut, the spindle configured to be driven in rotation relative to the spindle nut, wherein the threaded spindle is supported on one of the first and second casings, and the spindle nut is supported on the other of the first and second casings in the direction of the axis, and wherein the energy absorption element is arranged between the spindle nut and the one of the first and second casings or between the threaded spindle and the other of the first and second casings, wherein the spindle nut or the threaded spindle is supported on the engagement part in the direction of the axis.

8. The steering column of claim 1 wherein at least one deformation element is connected to one of the first and second casings via a predetermined break element.

9. A steering column for a motor vehicle, comprising:
a steering spindle defining an axis of rotation;
a first casing;
a second casing telescopically receiving the first casing, the second casing being configured to connect to a body of the motor vehicle;
an energy absorption device coupling the first and second casings, wherein the energy absorption device comprises two deformation sections arranged one behind the other in a direction of the axis of rotation; and
a coupling device comprising an actuator and a coupling element that extends selectively from the actuator, wherein the coupling device is at all times spaced apart from the two deformation sections of the energy absorption device, wherein at least one of the two deformation sections is configured to couple between the first and second casings via the coupling device or decouple therefrom, at least one of the two deformation sections configured to plastically deform in the coupled state in the event of relative displacement between the first and second casings, wherein the at least two deformation sections are formed on a single-piece energy absorption element.

10. The steering column of claim 9 comprising a driver that is disposed in a first of the two deformation sections and is fixed relative to the second casing when the coupling element extends from the actuator.

11. The steering column of claim 10 wherein the driver remains disposed in the first deformation section when the coupling element retracts into the actuator.

12. The steering column of claim 10 comprising a connecting part disposed between the driver and the coupling element of the coupling device, wherein the connecting part is configured to receive the coupling element when the coupling element extends from the actuator.

13. The steering column of claim 9 wherein the coupling element is configured to move between a retracted position and an extended position, wherein a direction of movement between the retracted and extended positions is other than a direction extending radially from the axis of rotation.

14. The steering column of claim 9 comprising:
a first driver disposed operatively between the coupling element of the coupling device and a first of the at least two deformation sections; and
a second driver disposed at a second of the at least two deformation sections.

15. The steering column of claim 14 wherein the second driver is disposed on an engagement part that cooperates with a clamping device that permits the first casing to be repositioned relative to the second casing.

16. The steering column of claim 15 wherein the both the first and second drivers extend from the engagement part, wherein the engagement part includes a toothed plate.

17. A steering column comprising:
a steering spindle defining an axis of rotation;
a first casing;
a second casing that telescopically receives the first casing;
an energy absorption device coupling the first and second casing to each other, the energy absorption device comprising a first deformation section and a second deformation section arranged one behind the other in a direction of the axis of rotation;
a coupling device, wherein the first deformation section is configured to selectively couple between the first and second casings via the coupling device, wherein when the first deformation section couples the first and second casings both the first and second deformation sections are configured to plastically deform upon relative displacement between the first and second casings, wherein the first and second deformation sections are part of a single-piece energy absorption element; and
an engagement part including:
a first driver element that is configured to operably engage with the first deformation section, and
a connecting part with a second driver element that is configured to operably engage with the second deformation section, wherein the engagement part and the connecting part are operatively connected via the coupling device so as to be operatively separated from one another.

18. The steering column of claim 17 wherein a clamping apparatus is provided which in a locked position secures the casings relative to one another and which in a released position permits telescopic adjustment of the casings, wherein the clamping apparatus has at least one locking part which is supported on one of the first and second casings in the direction of the axis, and in the locked position is connected to the engagement part so as to be non-displaceable in the direction of the axis, the locking part being connected to the other of the first and second casings, and in the release position is disconnected from the engagement part and permits a relative movement of the casings.

19. The steering column of claim 17 wherein a motor-operated adjustment drive is arranged between the first casing and the second casing and includes a spindle drive with a threaded spindle that engages in a spindle nut, the threaded spindle configured to be driven in rotation relative to the spindle nut, wherein the threaded spindle is supported on one of the first and second casings, and the spindle nut is supported on the other of the first and second casings in the direction of the axis, and wherein the energy absorption element is arranged between the spindle nut and the one of the first and second casings or between the threaded spindle and the other of the first and second casings, wherein the spindle nut or the threaded spindle is supported on the engagement part in the direction of the axis.

* * * * *